(12) United States Patent
de Jong et al.

(10) Patent No.: US 11,004,069 B2
(45) Date of Patent: May 11, 2021

(54) ARTICLE AND METHOD FOR TRANSACTION IRREGULARITY DETECTION

(71) Applicant: NXP B.V., Eindhoven (NL)

(72) Inventors: Hans de Jong, Eindhoven (NL); Pieter Janssens, Leuven (BE)

(73) Assignee: NXP B.V., Eindhoven (NL)

( * ) Notice: Subject to any disclaimer, the term of this patent is extended or adjusted under 35 U.S.C. 154(b) by 1209 days.

(21) Appl. No.: 14/045,776

(22) Filed: Oct. 3, 2013

(65) Prior Publication Data

US 2015/0100497 A1   Apr. 9, 2015

(51) Int. Cl.
  *G06Q 20/38*   (2012.01)
  *G06Q 20/40*   (2012.01)

(52) U.S. Cl.
  CPC ....... *G06Q 20/3829* (2013.01); *G06Q 20/389* (2013.01); *G06Q 20/401* (2013.01); *G06Q 20/4016* (2013.01)

(58) Field of Classification Search
  CPC ............. G06Q 20/3829; G06Q 20/389; G06Q 20/401; G06Q 20/4016
  (Continued)

(56) References Cited

U.S. PATENT DOCUMENTS 5,903,882 A    5/1999  Asay et al.
6,434,238 B1*  8/2002  Chaum ................ G06Q 20/341
                                                        380/30

(Continued)

FOREIGN PATENT DOCUMENTS

CN    1783024 A       6/2006
JP    H11306438 A    11/1999

(Continued)

OTHER PUBLICATIONS

"EMV Integrated Circuit Card Specifications for Payment Systems—Book 2", downloaded from https://www.emvco.com/wp-content/uploads/2017/05/EMV_v4.3_Book_2_Security_and_Key_Management_20120607061923900.pdf and attached as a PDF file (Year: 2011).*

(Continued)

*Primary Examiner* — James D Nigh
*Assistant Examiner* — Margaret M Neubig (57) ABSTRACT

Articles and methods for transaction irregularity detection are disclosed. In one example, the article discloses: a memory including a record of a last-reported security-device transaction with the security-device, and including a last-reported transaction counter value associated with the last-reported security-device transaction; a previous device identifier; a record of the previous security-device transaction with the security-device, and including the previous device identifier associated with the previous security-device transaction; a record of a current security-device transaction with the security-device, and including a currently-reported transaction counter value associated with the current security-device transaction; and a back-end device tagging the previous device with fraud if the current transaction counter value differs from the last-reported transaction counter value by other than an increment. In one example, the method discloses: a transaction irregularity detection process based on the article.

12 Claims, 4 Drawing Sheets

(58) Field of Classification Search
USPC .................................................. 705/50–79
See application file for complete search history.

(56) References Cited

U.S. PATENT DOCUMENTS

| | | | |
|---|---|---|---|
| 6,745,935 B1 | 6/2004 | Grien et al. | |
| 7,103,575 B1* | 9/2006 | Linehan | G06Q 20/12 235/379 |
| 7,234,063 B1* | 6/2007 | Baugher | H04L 9/0833 380/259 |
| 7,996,324 B2* | 8/2011 | Bishop | G07F 7/1083 705/64 |
| 8,351,857 B2 | 1/2013 | Miura | |
| 9,514,458 B2* | 12/2016 | Rutherford | G06Q 20/04 |
| 2004/0025066 A1 | 2/2004 | Jackson et al. | |
| 2005/0172137 A1* | 8/2005 | Hopkins | G07F 7/1008 713/185 |
| 2006/0012473 A1 | 1/2006 | Bishop et al. | |
| 2006/0129759 A1 | 6/2006 | Bartlett et al. | |
| 2007/0012763 A1 | 1/2007 | Van De Velde | |
| 2009/0048953 A1* | 2/2009 | Hazel | G07F 7/1008 705/35 |
| 2009/0313134 A1 | 12/2009 | Faith et al. | |
| 2011/0161229 A1 | 6/2011 | Mastrangelo et al. | |
| 2013/0191290 A1* | 7/2013 | Glendenning | G06Q 20/40 705/71 |
| 2013/0226797 A1 | 8/2013 | Chang | |

FOREIGN PATENT DOCUMENTS

| | | |
|---|---|---|
| JP | 2004-334664 A | 11/2004 |
| JP | 2010-267040 A | 11/2010 |
| WO | 00/22583 A1 | 4/2000 |
| WO | 2007/121316 A2 | 10/2007 |
| WO | 2008/061234 A2 | 5/2008 |
| WO | 2019045890 A1 | 3/2019 |

OTHER PUBLICATIONS

Usenix reference ("Risks and Potentials of Using EMV for Internet Payments", attached as PDF file, downloaded from https://www.usenix.org/legacy/events/smartcard99/full_papers/herreweghen/herreweghen.pdf (Year: 1999).*

Bond, ("Chip and Skim: cloning EMV cards with the pre-play attack", downloaded from https://arxiv.org/pdf/1209.2531.pdf, attached as PDF file (Year: 2012).*

Usenix reference ("Risks and Potentials of Using EMV for Internet Payments", attached as PDF file in prior action, downloaded from https://www.usenix.org/legacy/events/smartcard99/full_papers/herreweghen/herreweghen.pdf (Year: 1999).*

Bond, ("Chip and Skim: cloning EMV cards with the pre-play attack", downloaded from https://arxiv.org/pdf/1209.2531.pdf, attached as PDF file in prior action (Year: 2012).*

Singapore Standard SS 518 : 2006, Specification for Contactless e-Purse Application Table of Contents; 6 pages (2004).

Smartcard; retrieved from the Internet http://en.wikipedia.org/wiki/Smartcard; 7 pages (Mar. 4, 2014).

Wikipedia; "EMV"; retrieved from the Internet http://en.wikipedia.org/wiki/EMV; 10 pages (Mar. 4, 2014).

Yih, Lin; "Singapore update—CEPAS, SSID, NFC-CFC"; Asia IC Card Forum; 33 pages (Dec. 5, 2011).

Office Action for CN Counterpart Appln. No. 201410502889.3 (dated Feb. 21, 2017).

Office Action for EP Counterpart Appln. No. 14187027.9 (dated Nov. 30, 2017).

Office Action for counterpart JP patent appl. No. 2014-204091 (dated Dec. 1, 2015).

Dworkin, Morris, "Recommendation for Block Cipher Modes of Operation: The CMAC Mode for Authentication," NIST Special Publication 800-38B, US Department of Commerce, May 2005, 21 pages.

* cited by examiner

ARTICLE AND METHOD FOR TRANSACTION IRREGULARITY DETECTION

BACKGROUND

Brief Background Introduction

This specification relates generally to transaction irregularity detection in commercial and/or private transactions. Further improvements are desired.

DETAILED DESCRIPTION

In some example embodiments, backend operators (e.g. smart-card issuers) enable customers to use their smart-card at terminals installed at various merchant (e.g. retailer) point-of-sale (POS) locations. Smart-card users can debit or credit their smart-card using the merchant terminals to procure goods or services, or to add credits to the smart-card for future use. The backend operator either reimburses the merchant when a debit transaction occurs, or requests payment from the merchant when a credit transaction occurs.

Smart-cards include chip cards, integrated circuit cards, contactless smart-cards. Typically smart-cards are pocket-sized or smaller object having embedded integrated circuits. Smart-cards can be used as credit-cards, bank debit cards, electronic wallets, transit passes, as so on. A contactless smartcard can also be built into mobile devices such as a phone, tablet, music player, video player, and the like. Smart-cards are also a type of security-device. Security-devices are herein defined to include: smart-cards, smartcard emulations, various secure elements, mobile phones, embedded mobile components, other mobile devices, and various other secure implementations. While certain example embodiments discussed in this specification mention smart-cards, these example embodiments are also applicable to such security-devices.

Merchants however sometimes attempt to commit fraud using the merchant terminals, and backend operators need to be sure a merchant is not claiming more for reimbursement than they are entitled to. Possible types of fraud include:

Invented or missing transactions, for example, missing transactions in combination with a previously higher write off from a customer's smart-card and then reimbursing the customer;

Increasing smart-card balance, allowing for higher reimbursement claims;

Multiple reimbursement claims (i.e. replay attack) of the same transaction by sending it multiple time to the backend operator; and Sniffing transactions, such as valid transactions with non-customer smart-cards whose holders do not know that their smart-card is being accessed.

A specific missing transaction fraud example is now discussed. A customer procures a smart-card having an internally stored account balance of 100 units of value from a Bank. Note that the exact unit of value is not material to this discussion and in various embodiments could be a Euro, a Dollar, or some other unit of credit whether officially authorized by a government or privately issued by a service or product provider. A unit of value is herein defined to be broader than just monetary value and includes anything of perceived value to a party to a current, future or anticipated transaction (e.g. a number of rides on public transport system or in an amusement park).

In this example, the customer visits a merchant and requests 20 units worth of goods from the merchant. Using the merchant terminal, the merchant debits 100 units from the smart-card, and reports a 100 unit debit claim to the Bank. The Bank reimburses the merchant for 100 units of value. Next the merchant uses the merchant terminal to credit 80 units in funds back to the smart-card's internal account balance. The merchant prevents the merchant terminal from reporting this credit claim to the Bank. The Bank is not aware of the 80 unit credit, so does not deduct 80 units in value from the merchant. Thus the merchant fraudulently obtains 80 units of value.

In some example embodiments, invented and missing transactions fraud can be lessened by including a Secure Access Module (SAM) in the merchant terminal, to help prove transactions towards the backend operator by recording them. Increasing the smart-card balance type of fraud can be lessened if the merchant (i.e. the keys in the merchant's terminal) only require limited access rights, by giving the merchant (i.e. the keys in the merchant's terminal) only read and debit rights. Multiple reimbursement claims fraud can be lessened if the backend keeps logs or a fingerprint of every transaction. For every new transaction one then needs to look up whether it already has been seen. Sniffing transactions fraud can be countered if the smart-card issuer keeps a trace of all transactions relating them with the customer (smart-card holder) and merchant.

In response to the concerns with the example embodiments discussed above, additional example embodiments are now discussed. These examples present techniques to protect against fraudulent merchants by computing a MAC over transaction data and a transaction counter with a key shared by the smart-card and the backend linking merchant identities across transactions by storing them on the smart-card and reporting them to the backend in a future transaction.

Figure 1:
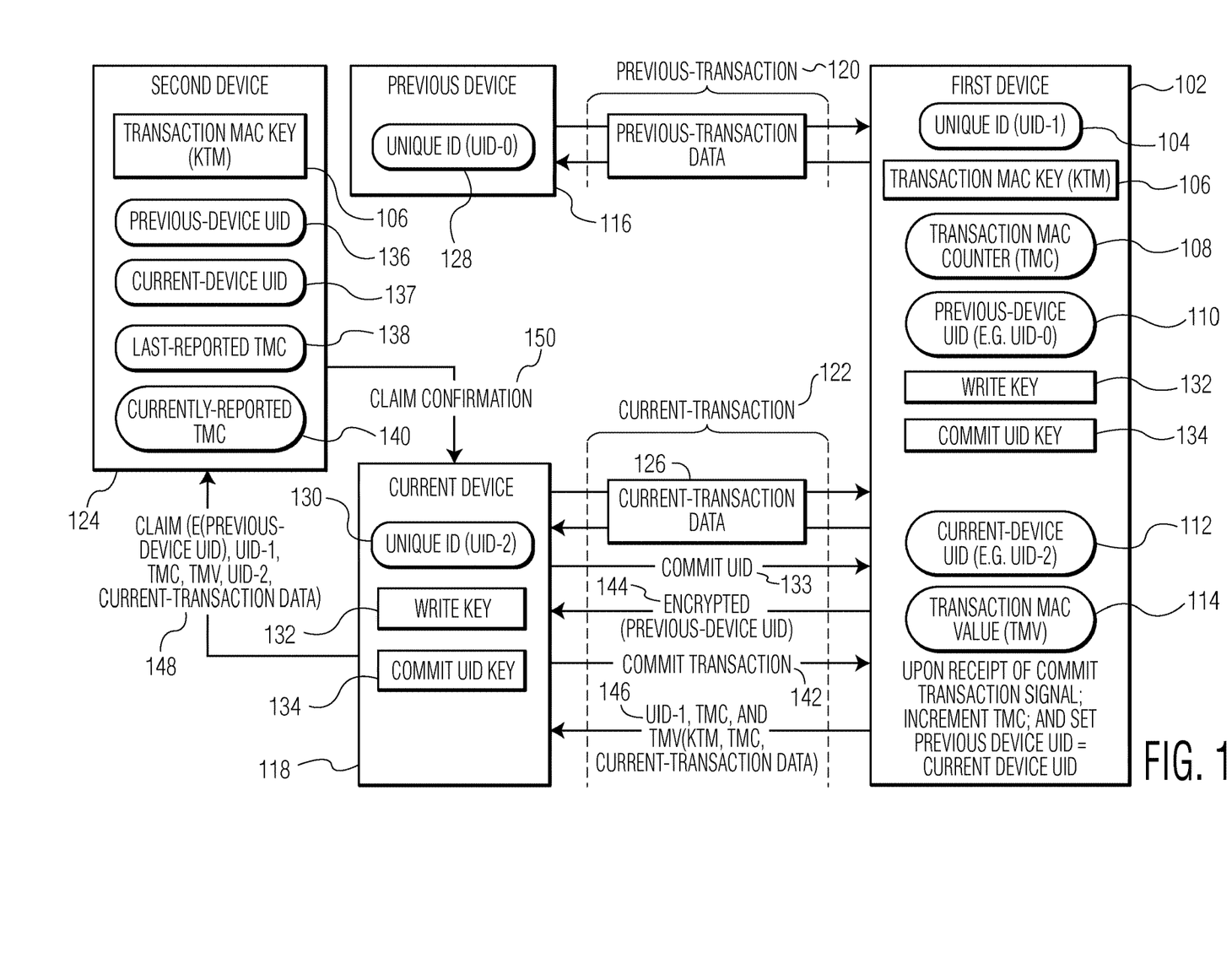
FIG. 1 is a first example of a system for transaction irregularity detection.

FIG. 1 is a first example of a system for transaction irregularity detection. Transaction irregularity is herein defined to include fraud, device failure, network failure, and tearing the card from an RF field. While there are many types of irregularity, in one example embodiment, discussed below, the transaction irregularity is a type of fraud.

A first device 102, includes a first unique ID (e.g. UID-1) 104, a Transaction MAC Key (KTM) 106, a Transaction MAC Counter (TMC) 108, a Previous-device UID 110, a Current-device UID 112, a Transaction MAC Value (TMV) 114, a write key 132, and a commit key 134. In an example embodiment, the first device 102 is either a smart-card or a contactless smart-card.

The first unique ID 104, labeled UID-1, is uniquely bound to the first device 102 and provides an ability to uniquely identify the first device 102. As is discussed, UIDs are used to identify transactional devices with which the first device 102 engages with, such as a previous transactional device 116 (UID-0) and a current transactional device 118 (UID-2).

These UIDs 128 and 130, in an example embodiment, are also uniquely bound to their respective devices 116 and 118.

In an example embodiment, the previous device 116 is merchant with which the first device 102 (e.g. a smart-card) engaged in a previous-transaction 120 with. In an example embodiment, the current device 118 is merchant with which the first device 102 (e.g. a smart-card) is engaged with in a current-transaction 122. Those skilled in the art will recognize that these devices 102, 116 and 118 can in other examples be non-merchant and non-sales devices, such as transportation or other ticketing related devices.

The Transaction MAC Key (KTM) 106 is a cryptographical key used to compute a type of MAC (Message Authentication Code) which in one example is a short piece of information used to authenticate a message and to provide integrity and authenticity assurances on the message. Integrity assurances detect accidental and intentional message changes, while authenticity assurances affirm the message's origin. The KTM 106 or a session key derived from KTM is used to authenticate transactions, such as the previous-transaction 120 and the current-transaction 122, between the first device 102 (e.g. smart-card) and the previous merchant terminal device 116 and current merchant terminal device 118. In another example embodiment session keys are derived from the transaction MAC Key 106, where one of the derived session keys is used for encrypting a previously committed ReaderID and one is used for MAC-ing of transaction data.

In one example, the KTM 106 is not shared with (i.e. not discernible to) the previous and current merchant devices 116 & 118 so as to reduce chances of the merchant sending a forged MAC (which may be used to commit fraud) to a second device 124 (e.g. a backend device or operator such as a smart-card issuer, bank, credit provider, transactional credit authorization device, etc.).

In one example, the KTM 106 is a static-key shared between the smart-card and a backend operator (e.g. a smart-card issuer) and does not change once the smart-card is issued. In another example, the KTM 106 can be changed. The merchant however could act as a conduit for an encrypted version of the KTM 106 which is exchanged between the smart-card and the backend operator. The backend operator can distribute the smart-card with the KTM 106 preloaded. In one example, the KTM 106 stored on the first device 102 is UID-diversified. In another example, the KTM 106 is not reused for other purposes, like reading or writing files.

The Transaction MAC Counter (TMC) 108 counts a number of transactions (such as the previous-transaction 120 and the current-transaction 122, which perhaps representing debit and credit transactions) engaged in between the first device 102 and the previous and current devices 116 & 118. The TMC 108 increments in response to a transaction with the first device 102. The increment can be fixed or variable, and in one example is an integer number that increments by 1. The first device 102, in one example, transmits the TMC 108 to the second device 124 after each transaction (e.g. 120, 122). As a result, the second device 124 (e.g. backend operator) can use the TMC 108 to detect both replay attacks (e.g. a same transaction submitted multiple times) and unreported (e.g. missing) transactions. In different examples, the TMC 108 is either resettable or not resettable.

The previous-device UID 110 identifies a unique identifier 128 (UID-0) for the previous device 116. The current-device UID 112 identifies a unique identifier 130 (UID-2) for the current device 118. The first device 102, in one example, encrypts the previous-device UID 110 before transmitting to the second device 124.

The transaction mac value (TMV) 114 is used by the second device 124 (e.g. backend operator) to prove execution of a transaction between the first device 102 (e.g. a contactless smart-card) and the current device 118 (e.g. a merchant terminal). The TMV 114 would be computed by the first device 102 over a predetermined set of current-transaction parameters using the KTM (or a session key derived from KTM) 106 that is shared between the second device 124 and the first device 102, but not shared with the current or previous devices 118 & 116.

In one example, the TMV 114 is calculated by the first device 102 based on the KTM 106, the TMC 108, and current-transaction data 126. The current-transaction data 126, in one example, includes a value amount either debited from, or credited to a smart-card (e.g. first device 102).

In alternate examples, the TMV is also computed using a Transaction MAC Session Key. The transaction MAC Session Key is derived from the KTM 106 and the TMC 108. Use of a session key may also reduce a potential for fraud in the current-transaction 122.

The write key 132 can be a debit-key, a credit-key, or another key which supports execution of the current-transaction 122 with the first device 102.

The current device 118, shown in FIG. 1, includes the unique ID (UID-2) 130, the write key 132, and the commit key 134. The commit key 134 is a key used to commit 133 the unique ID 130 of the current device 118 with the first device 102, during the transaction. In return the first device 102, sends the encrypted previous-device 116 UID 128, which is later on transferred to a second device 124 to allow identification of fraudulent merchant in case of missing transaction. The encrypted previous-device 116 UID 128 was stored in the previous-device UID 110 in the first device 102. Note that the encrypted previous-device 116 UID 128 was originally stored in the current-device UID 112, but now the current-device UID 112 stores the unique ID 130 of the current device 118.

In one example, the current device 118 (e.g. merchant terminal) contains a Secure Access Module (SAM). The SAM is configured to prevent the current device 118 from setting or modifying its unique ID (i.e. UID-2). The SAM is also configured to prohibit export or exposure of authentication and related session keys. A SAM secured current device 118 allows the second device 124 (e.g. a backend operator) to correctly identify a fraudulent merchant in case of missing transaction by the previous device 116. This is what is reported (encrypted UID-0) to the second device 124 during the current transaction 122. For example, requiring a merchant's terminal to commit its UID during a transaction would enable the backend operator to better identify the source of any fraudulent merchant behavior.

The second device 118, shown in FIG. 1, includes the KTM 106, a previous-device UID 136, a current-device UID 137, a Last-Reported TMC 138, and a Currently-Reported TMC 140. The second device 118 maintains a list of "TMC and Previous-Device UID" pairs for each smartcard (i.e. first-device 102) UID, to be able to conclude which merchant did not report a missing transaction for a certain first-device 102 smartcard (e.g. missing TMC>>previous-device 116 merchant UID of the next TMC committed fraud).

The previous-device UID 136 and current-device UID 137 form part of a UID history which keeps a record of each device (e.g. the first device 102, the previous device 116 and the current device 118) for which the second device 118 manages transactions (e.g. the previous-transaction 120 and the current-transaction 122). The UID history may not be complete if either the previous device 116 did not report the previous-transaction 120 or the current device 116 does not report the current-transaction 120. The UID history can in example embodiments be of any size and thereby used for customer billing purposes.

If the previous device 116 properly reported (i.e. claimed) the previous-transaction 120 to the second device 124 (e.g. backend operator), the current device UID 137 related to the last-reported TMC 138 will be equal to the previous device UID 110 related to the currently-reported TMC 140, i.e. the UID 128 stored when the first device 102 (e.g. smart-card) engaged in the previous-transaction 120 (e.g. debit or credit) with the previous device 116 (e.g. merchant terminal). The last-reported TMC 138 and currently-reported TMC 140 will be subsequent values.

If the previous device 116 did not properly reported the previous-transaction 120, the previous-device UID 110 related to the currently-reported TMC 140 will allow the second device 124 (i.e. the backend) to detect the non-reporting previous device 116 (i.e. the fraudulent merchant) due to the fact that this previous device UID 110 was stored on the first device 102 during the previous transaction 120, and was communicated encrypted to the current device 118 during the current transaction 122 and by the current device 118 to the second device 124 when claiming reimbursement. The second device 124 will be able to decrypt the previous device UID 110 using KTM 106 (or a session key derived from it).

One example of the current-transaction 122 between the first device 102, the current device and the second device 124 is now discussed. The current-transaction 122 can be implemented in a variety of ways, only one of which is now discussed, and can include a greater or lesser number of elements depending upon the example embodiment. Also, in various example embodiments, the current-transaction 122 (or the previous-transaction 120) is one from a group including: a value transaction (e.g. account information, debits & credits), a record transaction (e.g. public transit use, departure and arrival addresses, etc.), a data transaction, an information transaction (e.g. access or delivery of information). In one example, all updates on the first device 102 need to be done atomically during commit (e.g. writing transaction data, updating TMC and TMV, and replacing the previous device UID by the current device UID.

To begin execution of the current-transaction 122, the current device 118 uses the write key 132 to authenticate and protect the write operations (e.g. debit/credit within the current-transaction data 126) with the first device 102. The current device 118 (e.g. merchant terminal) also transmits (i.e. securely commits 133) its unique ID 130 (UID-2) to the first device 102. The first device 102 stores the unique ID 130 (UID-2) in the current-device UID 112. Various current-transaction data 126 is exchanged (e.g. a debit or credit of value units, as well as perhaps other details of the current-transaction 122 (e.g. date, time, location, product, service, etc.).

Commensurate with a particular transaction protocol for this example embodiment, the first device 102 transmits an encrypted (previous-device UID) 144 message to the current device 118. The encrypted (previous-device UID) 144 message encrypts the previous-device UID 110. In this example, the previous-device UID 110 contains the previous device's 116 unique ID (UID-0) 128.

The current device 118 transmits a commit transaction 142 message to the first device 102. The first device 102 then sets the previous-device UID 110 equal to the current-device UID 112 which contains the current device's 118 unique ID 130 (UID-2). In certain example embodiments, the previous-device UID 110 can store multiple UIDs from a set of previous-transactions.

The first device 102 increments the TMC 108. The increment can take on various values, however, in one example embodiment the increment is "+1".

The first device 102 computes the TMV 114. In one example, the TMV 114 is a function of KTM 106, TMC 108, Current-Transaction Data 126. The first device 102 transmits its unique ID (UID-1) 104, the TMC 108 and the TMV 114 in a message 146 sent to the current device 118.

The current device 118 aggregates the encrypted (previous-device UID) 144 and the message 146 into a claim 148. The second device 124 decodes the encrypted (previous-device UID) 144 using its stored transaction MAC key (KTM) 106. The second device 124 stores the previous-device UID-0 in the previous-device UID 136 field and the current-device UID-1 in the current-device UID 137 field.

The second device 124 checks if the claim 148 is complete. In one example embodiment, the claim 148 is complete if the claim 148 contains the encrypted (previous-device UID) 144 and the UID-1, TMC, and TMV (KTM, TMC, Current-Transaction Data) message 146. With the complete claim 148, the second device 124 has visibility into not only the current-transaction 122 but also the previous-transaction 120 and the identity of the current device 118 and previous device 116.

The second device 124 stores the TMC 108 received from the first device 102 into the Currently-Reported TMC 140 and compares the Currently-Reported TMC 140 with the Last-Reported TMC 138 from a prior transaction, which may or may not be the previous-transaction 120. If the Currently-Reported TMC 140 differs from the Last-Reported TMC 138 by the increment (e.g. +1), the second device 124 sends a claim confirmation 150 to the current device 118. The claim confirmation 150 confirms that the second device 124 will settle accounts (e.g. credit or debit current device's 118 accounts and/or first device's 102 accounts in accordance with the claim 148).

However, if the Currently-Reported TMC 140 differs from the Last-Reported TMC 138 by an amount different from the increment (e.g. +1), the second device 124 sets a fraud flag (e.g. tags the previous device with fraud) and retrieves the UID stored in the previous-device UID 136. The improper TMC increment indicates that a device associated with the UID stored in the previous-device UID 136 did not report a proper claim 148, or perhaps any claim 148. In an example embodiment, a fraudulent (or potentially fraudulent) transaction was engaged in between the first device 102 and the previous device 116. Thus, if the previous device 116 did not report the previous-transaction 120 with the second device 124, then the second device 124 would notice the improper TMC increment and identify the previous device 116 as having not reported the previous-transaction 120.

The example above does not just describe a course of dealings where transactions are reported in chronological order, which is not necessarily the case. The above techniques can be equally applied to situations where merchants managing previous and current devices 116 and 118 only batch-report executed transactions once a week or over some other time period. Thus certain example embodiments herein allow for gaps of a certain time and the second device 124 is designed to detect fraud at a later time after batch-reports have been received.

If the previous-device UID 136 is equal to the current-device UID 137, the second device 124, in one example, does not send the claim confirmation 150 to the current device 118 and withholds any payments to the current device 118.

Since the first device 102 stores the current merchant device 118 UID-2 for the current-transaction 122 and the previous merchant device 116 UID-0 from the previous-transaction 120, the first device 102 enables the second device 124 (e.g. backend service provider) to link the current and previous devices 118 and 116. This allows the backend then to uniquely identify the merchant which did not report a previous-transaction 120 once the current-transaction 122 with the first smart-card device 102 is received.

Figure 2:
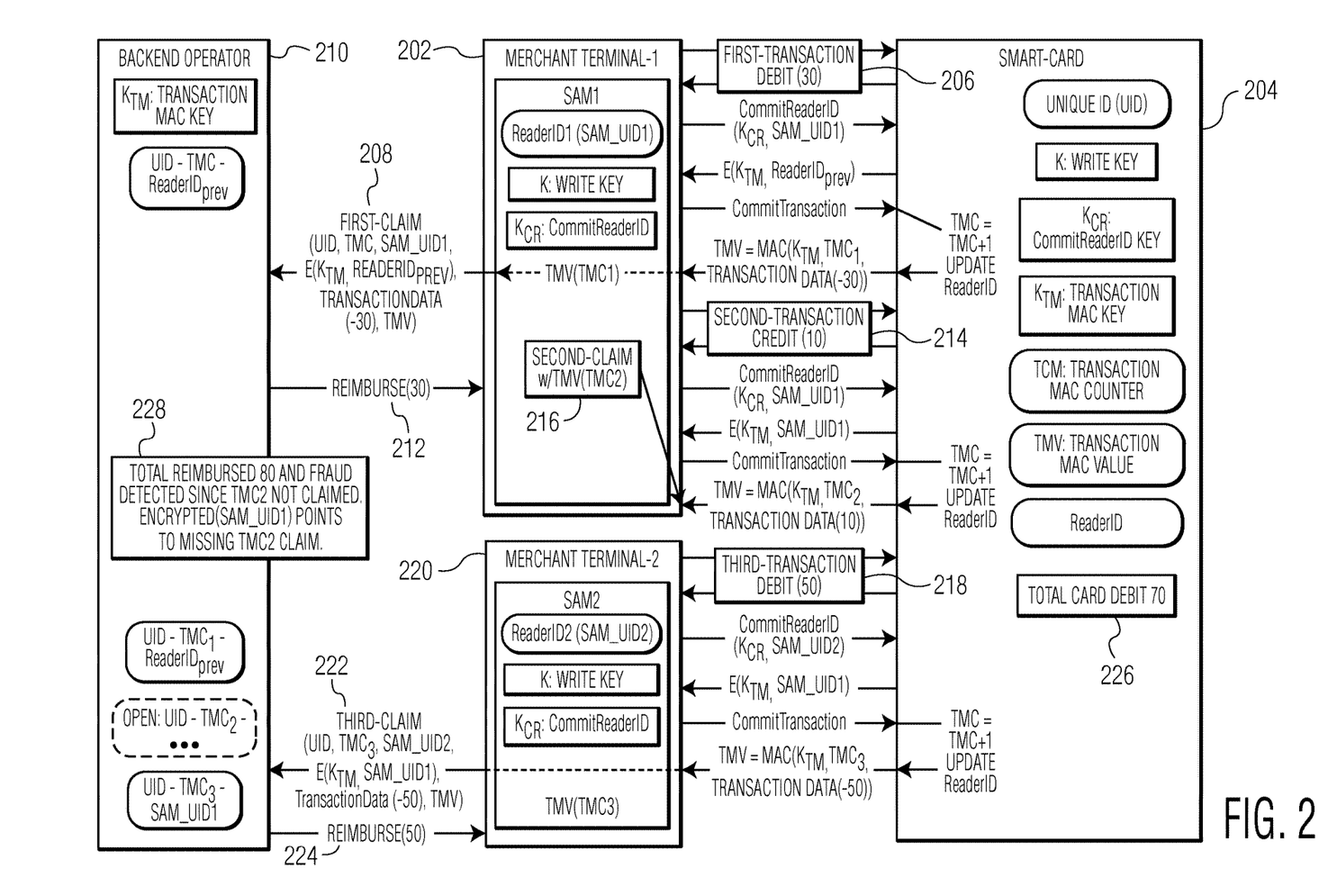
FIG. 2 is a second example of the system.

FIG. 2 is a second example embodiment of the system. The similarities between the example in FIG. 2 and the example in FIG. 1 will in general not be repeated. Instead certain portions of the example in FIG. 2 will be highlighted.

In FIG. 2, merchant terminal-1 202 debits 30 euros from a smart-card 204 in a first-transaction 206. The merchant terminal-1 202 then submits a first-claim 208, in accordance with the discussion in FIG. 1, to a backend operator 210 and receives a reimbursement 212 for 30 euros. Next, the merchant terminal-1 202 credits 10 euros to the smart-card 204 in a second-transaction 214. The merchant terminal-1 202 however does not submit (e.g. blocks) a second-claim 216 to the backend operator 210. By only reporting the first-transaction 206 the merchant is reimbursed for 30 euros by the backend 210, while actually the merchant should only get 20 euros if the merchant terminal-1 202 reported both transactions.

The smart-card 204 then engages in third-transaction 218 with a merchant terminal-2 220. The merchant terminal-2 220 debits 50 euros from the smart-card 204 in the third-transaction 218. The merchant terminal-2 220 then submits a third-claim 222 to the backend operator 210 and receives a reimbursement 224 for 50 euros.

The backend operator 210 can first detect that the second-transaction 214 is missing since TMC=TMC+2 when the backend operator 210 expected TMC=TMC+1. In response to this unexpected TMC increment, the backend operator 210 fetches the encrypted ReaderID1 (i.e. SAM UID1) pointing to merchant terminal-1 202 as the merchant terminal which engaged in the unreported second-transaction 214 and associated unreported second-claim 216.

Thus even when the merchant does not report this 10 euro credit, the TMC on customer's smart-card 204 is incremented, priming the backend operator 210 to notice that when the TMC is finally reported during the third-transaction 218 that there is a missing transaction. By requiring the merchant terminal-1 202 to send a Commit Reader ID message to the smart-card 204 and then having the smart-card 204 encrypt the Commit Reader ID with the $K_{TM}$: Transaction MAC Key to generate a $E(K_{TM}, ReaderID_{prev}$ message sent to the backend operator 210, the backend operator 210 has visibility into each merchant terminal associated with each transaction with the smart-card 204. With this visibility, the back-end operator 210 can detect that a total card debit 226 of 70 euros is not equal to a total reimbursement 228 of 80 euros paid and that this discrepancy is due to actions of the merchant terminal-1 202.

In one example, the merchant terminal-1 202 must send the Commit Reader UID to the smart-card 204, before the merchant terminal-1 202 can send the Commit Transaction message to the smart-card 204.

Encrypting the ReaderIDs of the merchant terminals protects the privacy of the smart-card 204 user as the user is engaged in various shopping and other transactional activities. Thus, a "next merchant" will not know who a "previous merchant" is, but the backend operator 210 (e.g. a Bank) can decrypt the ReaderIDs for billing and fraud prevention purposes.

In various example embodiments one or more of the following may be implemented: a first merchant may be able to get his fraud claim reimbursed at first, but will later on be identified as having not reported a transaction. The CommitReaderID can be authenticated with a specific application key, which can be a key that is already used during the transaction for reading or writing to files. The CommitReaderID is MAC'ed and is protected by a key which is not exported from the SAM, thereby preventing a fraudulent merchant from forging its ReaderID. Note that the ReaderID that is committed is also uniquely bound and stored within the SAM, i.e. a merchant cannot provide an ID as input for this operation.

Figure 3:
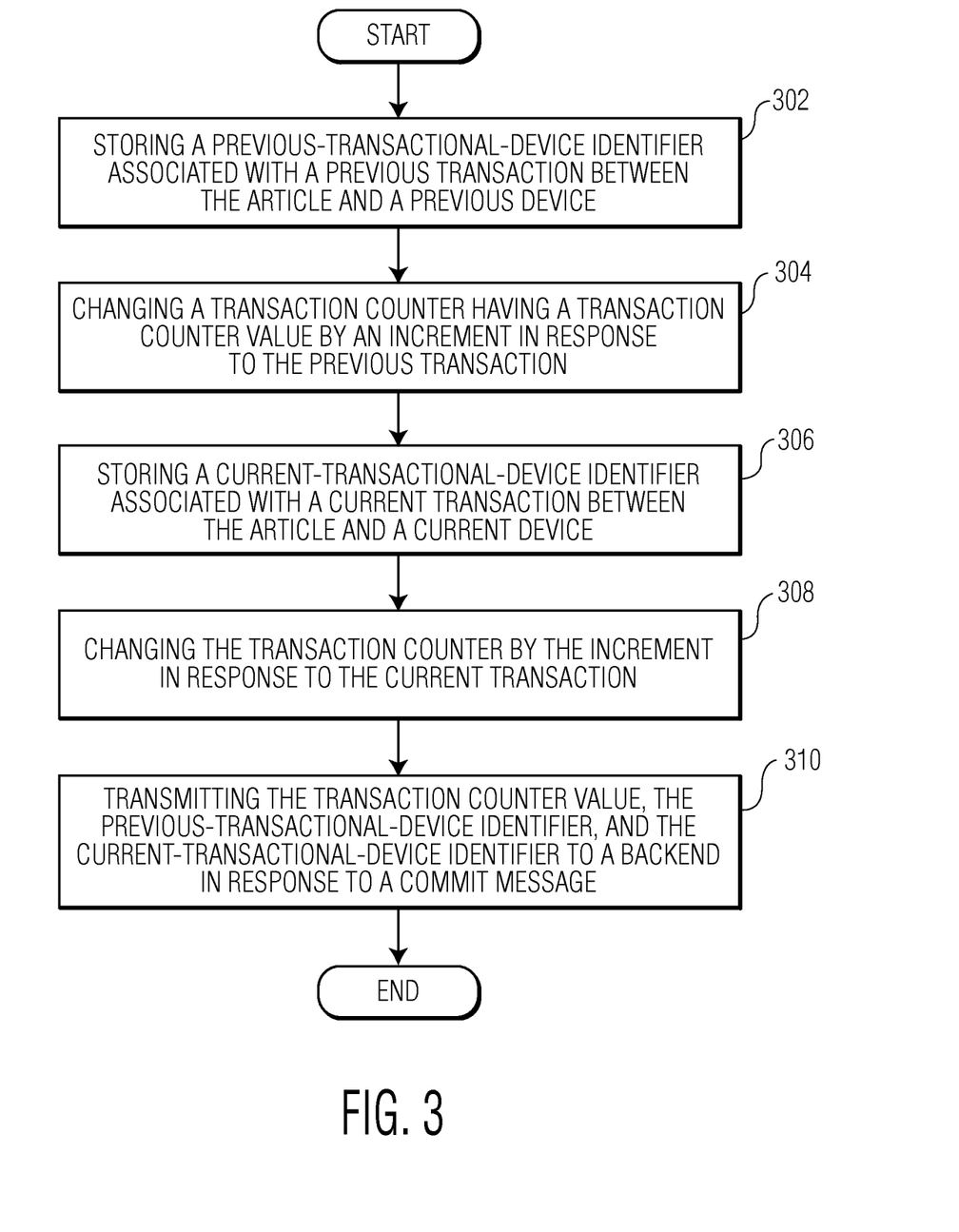
FIG. 3 is one example of a flowchart for implementing a method for transaction irregularity detection on a first device.

FIG. 3 is one example of a flowchart for implementing a method for transaction irregularity detection on a first device for facilitating fraud detection by a backend. The method begins in block 302, by storing a previous-transactional-device identifier associated with a previous transaction between the article and a previous device. In block 304, changing a transaction counter having a transaction counter value by an increment in response to the previous transaction. Then in block 306, storing a current-transactional-device identifier associated with a current transaction between the article and a current device. In block 308, changing the transaction counter by the increment in response to the current transaction. Then in block 310, transmitting the transaction counter value, the previous-transactional-device identifier, and the current-transactional-device identifier to a backend in response to a commit message.

Figure 4:
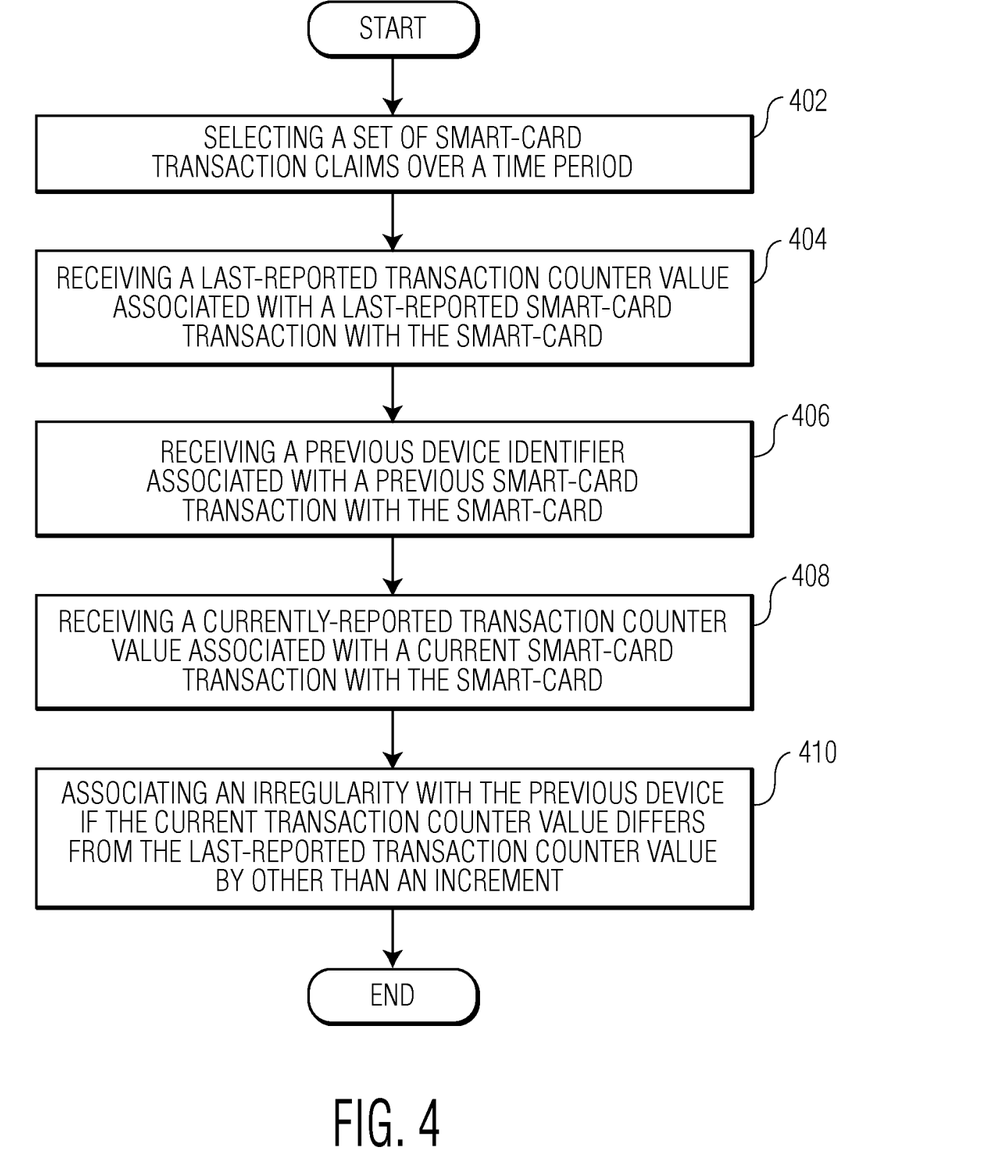
FIG. 4 is one example of a flowchart for implementing a method for transaction irregularity detection on a second device.

FIG. 4 is one example of a flowchart for implementing a method for transaction irregularity detection on a second device within a previous smart-card transaction between a smart-card and a previous device. The method begins in block 402 by selecting a set of smart-card transaction claims 148 over a time period. Because the second device 124 may receive claims 148 not in chronological order, the set selected in one example corresponds to a predetermined time period in which all merchants are required to report their claims 148. This time period can be set by a contract between the second device 124 and the previous and current devices 116, 118. Once up to a certain time all claims 148 should be reported to the second device 124, afterwhich the second device 124 can look for gaps in the TMC values to detect missing reports and fraud.

In block 404, receiving a last-reported transaction counter value associated with a last-reported smart-card transaction with the smart-card. Next in block 406, receiving a previous device identifier associated with the previous smart-card transaction with the smart-card. Then in block 408, receiving a currently-reported transaction counter value associated with a current smart-card transaction with the smart-card. In block 410, associating an irregularity with the previous device if the current transaction counter value differs from the last-reported transaction counter value by other than an increment.

The blocks comprising the flowcharts in the above Figures can be implemented in any order, unless a specific order is explicitly stated. Also, those skilled in the art will recognize that while one example method embodiment is now discussed, the material in this specification can be combined in a variety of ways to yield other examples as well. The method next discussed is to be understood within a context provided by this and other portions of this detailed description.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

Functional and software instructions described above are typically embodied as a set of executable instructions which are effected on a computer which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A processor can refer to a single component or to plural components.

In one example, one or more blocks or steps discussed herein are automated. In other words, apparatus, systems, and methods occur automatically. The terms automated or automatically (and like variations thereof) mean controlled operation of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more non-transient computer-readable or computer-usable storage media or mediums. The non-transient computer-usable media or mediums as defined herein excludes signals, but such media or mediums may be capable of receiving and processing information from signals and/or other transient mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A method for detecting a fraudulent transaction within a plurality of transactions between a smart card and a plurality of terminals, the method comprising:

for each transaction between the smart card and a respective terminal:

the smart card receiving a unique identifier (UID) of the respective terminal from the respective terminal, wherein the respective terminal is configured with a secure access module that prevents the respective terminal from modifying the UID of the respective terminal;

the smart card encrypting the UID of the respective terminal using a transaction key;

the smart card transmitting the encrypted UID of the respective terminal to the respective terminal, wherein the respective terminal does not know the transaction key;

the smart card incrementing a transaction counter value;

the smart card transmitting the transaction counter value to the respective terminal;

the respective terminal transmitting the encrypted UID and the transaction counter value to a fraud detecting device;

for a currently-reported transaction between the smart card and a particular terminal:

the fraud detecting device receiving a claim from the particular terminal, wherein the claim comprises an encrypted UID of the particular terminal and a counter value associated with the currently-reported transaction;

the fraud detecting device storing the counter value of the currently-reported transaction as a currently-reported counter value, wherein the counter value from a last-reported transaction is stored in the fraud detecting device as a last-reported counter value;

the fraud detecting device storing the encrypted UID of the particular terminal of the currently-reported transaction as a currently-reported terminal UID, wherein the encrypted UID of the particular terminal associated with the last-reported transaction is stored in the fraud detecting device as a last-reported terminal UID;

the fraud detecting device comparing the currently-reported counter value with the last-reported counter value;

the fraud detecting device determining whether the currently-reported counter value differs from the last-reported counter value by an expected increment amount;

in response to detecting, by the fraud detecting device, that the currently-reported counter value differs from the last-reported counter value by any value other than the expected increment amount, identifying the last-reported transaction as a fraudulent transaction and retrieving the last-reported terminal UID of the particular terminal associated with the last-reported transaction as an identification of a perpetrator of the fraudulent transaction.

2. The method of claim 1, further comprising:
the fraud detecting device decrypting the last-reported terminal UID received from the smart card with a stored transaction key.

3. The method of claim 2, wherein the stored transaction key is an asymmetric message authentication code (MAC) key.

4. The method of claim 2, wherein the stored transaction key cannot be accessed by any terminals of the plurality of terminals.

5. The method of claim 2, wherein the stored transaction key is a symmetric transaction message authentication code (MAC) key.

6. The method of claim 2, wherein
the stored transaction key is equal to the transaction key used by the smart card to encrypt the UID of the respective terminal.

7. The method of claim 1, wherein the last-reported transaction is a value transaction.

8. The method of claim 1, wherein the expected increment amount between the currently-reported counter value and the last-reported counter value is one.

9. The method of claim 1, wherein
the transaction key used by the smart card to encrypt the UID of the respective terminal is a session key derived from a Transaction Message Authentication Code (MAC) key.

10. The method of claim 1, further comprising:
for each transaction between the smart card and the respective terminal:
the smart card calculating a Transaction Message Authentication Code (MAC) Value based on the transaction counter value and the transaction key;
the smart card transmitting the Transaction MAC Value (TMV) to the respective terminal;
the respective terminal transmitting the TMV to the fraud detecting device.

11. The method of claim 10, further comprising:
for the currently-reported transaction between the smart card and the particular terminal:
the fraud detecting device receiving a TMV associated with the currently-reported transaction in the claim;
the fraud detecting device authenticating execution of the currently-reported transaction between the smart card and the particular terminal based upon the TMV included in the claim, wherein the TMV is authenticated based on the currently-reported counter value included in the claim and a stored transaction key in the fraud detecting device.

12. The method of claim 11, wherein
the stored transaction key used by the fraud detecting device for authentication is a session key derived from a Transaction Message Authentication Code (MAC) key.

* * * * *